(12) United States Patent
Smith et al.

(10) Patent No.: US 10,500,646 B2
(45) Date of Patent: Dec. 10, 2019

(54) TUBE PEELING WITNESS GROOVE METHODS AND APPARATUS

(71) Applicant: Georg Fischer Central Plastics LLC, Shawnee, OK (US)

(72) Inventors: Michael D. Smith, Shawnee, OK (US); Steven W. Vanantwerp, Shawnee, OK (US)

(73) Assignee: Georg Fischer Central Plastics LLC, Shawnee, OK (US)

( * ) Notice: Subject to any disclaimer, the term of this patent is extended or adjusted under 35 U.S.C. 154(b) by 393 days.

(21) Appl. No.: 15/137,415

(22) Filed: Apr. 25, 2016

(65) Prior Publication Data

US 2017/0304903 A1    Oct. 26, 2017

(51) Int. Cl.
*B29C 65/00*    (2006.01)
*B29C 65/34*    (2006.01)
(Continued)

(52) U.S. Cl.
CPC .............. *B23B 5/168* (2013.01); *B08B 1/005* (2013.01); *B08B 9/023* (2013.01); *B26D 3/001* (2013.01); *B26D 3/06* (2013.01); *B26D 3/28* (2013.01); *B29C 65/02* (2013.01); *B23B 2220/04* (2013.01); *B23B 2220/40* (2013.01); *B23B 2226/61* (2013.01); *B29C 65/34* (2013.01); *B29C 66/02241* (2013.01); *B29C 66/112* (2013.01); *B29C 66/522* (2013.01); *B29C 66/5229* (2013.01); *B29C 66/71* (2013.01); *B29L 2023/001* (2013.01)

(58) Field of Classification Search
CPC . B23B 5/168; B23B 2220/40; B23B 2220/04; B23B 2226/61; B08B 1/005; B08B 9/023; B26D 3/28; B26D 3/06; B26D 3/001; B29L 2023/001; B29C 66/5229; B29C 66/522; B29C 66/112; B29C 65/02; B29C 65/34; B29C 66/02241; B29C 66/71
USPC .......................................................... 156/272
See application file for complete search history.

(56) References Cited

U.S. PATENT DOCUMENTS 5,450,677 A    9/1995    Casey
5,600,862 A *  2/1997    Bleske ................... B08B 9/021
                                                15/104.04
(Continued)

FOREIGN PATENT DOCUMENTS

GB           2361452     *  3/2000
JP      2000288964 A       10/2000
(Continued)

OTHER PUBLICATIONS

European search opinion, EP 3238897 (Year: 2017).*
Rotary Peeler RS Instruction Manual, Jan. 2015, Georg Fischer Central Plastics, Shawnee, Oklahoma.

*Primary Examiner* — Michael N Orlando
*Assistant Examiner* — Christian Roldan
(74) *Attorney, Agent, or Firm* — Bachman & LaPointe, P.C.

(57) ABSTRACT

A tube scraping tool comprises: a handle; and a blade, carried by the handle. The tool has first and second laterally spaced apart portions for engaging the tube outer diameter (OD) surface during a drawing of the tool along the tube. The blade has a cutting edge trailing the first and second portions during the drawing and laterally between the first and second portions.

9 Claims, 3 Drawing Sheets

(51) Int. Cl.
  *B26D 3/00* (2006.01)
  *B23B 5/16* (2006.01)
  *B08B 1/00* (2006.01)
  *B08B 9/023* (2006.01)
  *B29C 65/02* (2006.01)
  *B26D 3/06* (2006.01)
  *B26D 3/28* (2006.01)
  *B29L 23/00* (2006.01)

(56) References Cited

U.S. PATENT DOCUMENTS

| | | | |
|---|---|---|---|
| 6,434,776 B1 | 8/2002 | Pfeiffer et al. | |
| 6,698,321 B2 * | 3/2004 | Oswald | B23B 5/168 82/113 |
| 6,968,762 B1 * | 11/2005 | Muckle | B23D 21/10 257/E23.088 |
| 2011/0232434 A1 | 9/2011 | Bortoli | |
| 2015/0321260 A1 * | 11/2015 | Goodman | B23B 5/168 82/1.11 |

FOREIGN PATENT DOCUMENTS

| | | |
|---|---|---|
| JP | 2007152513 A | 6/2007 |
| JP | 2010007734 A | 1/2010 |
| JP | 4870225 B1 | 2/2012 |
| JP | 2014144505 A | 8/2014 |

\* cited by examiner

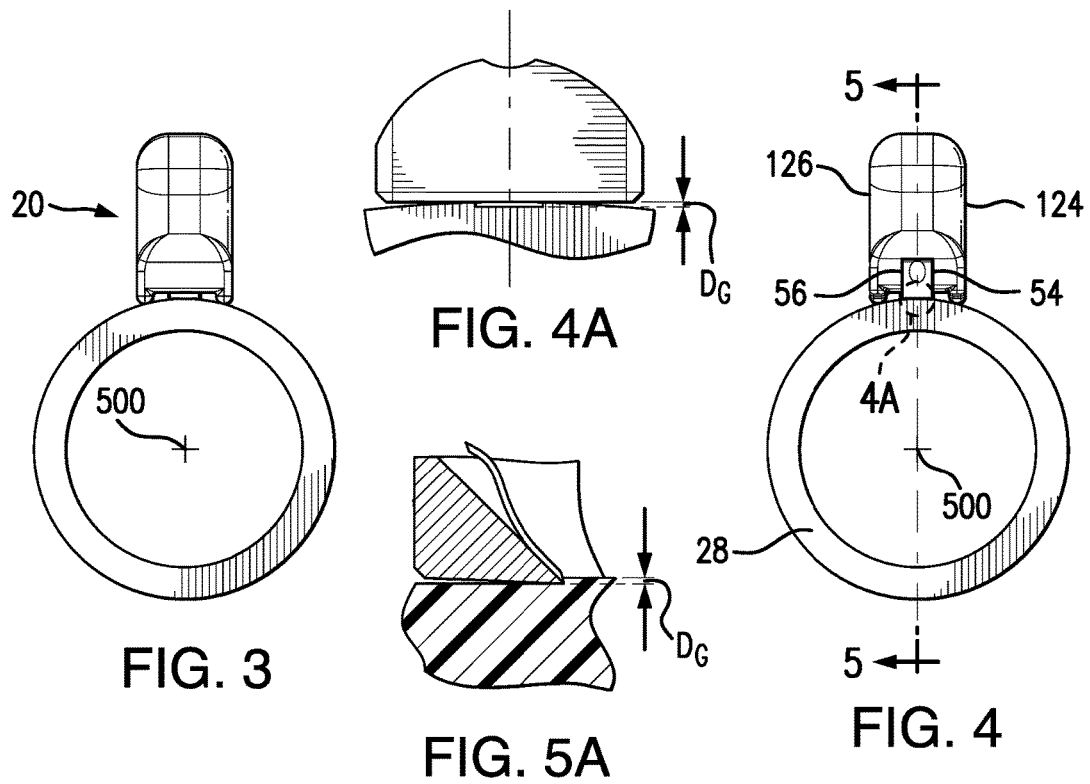
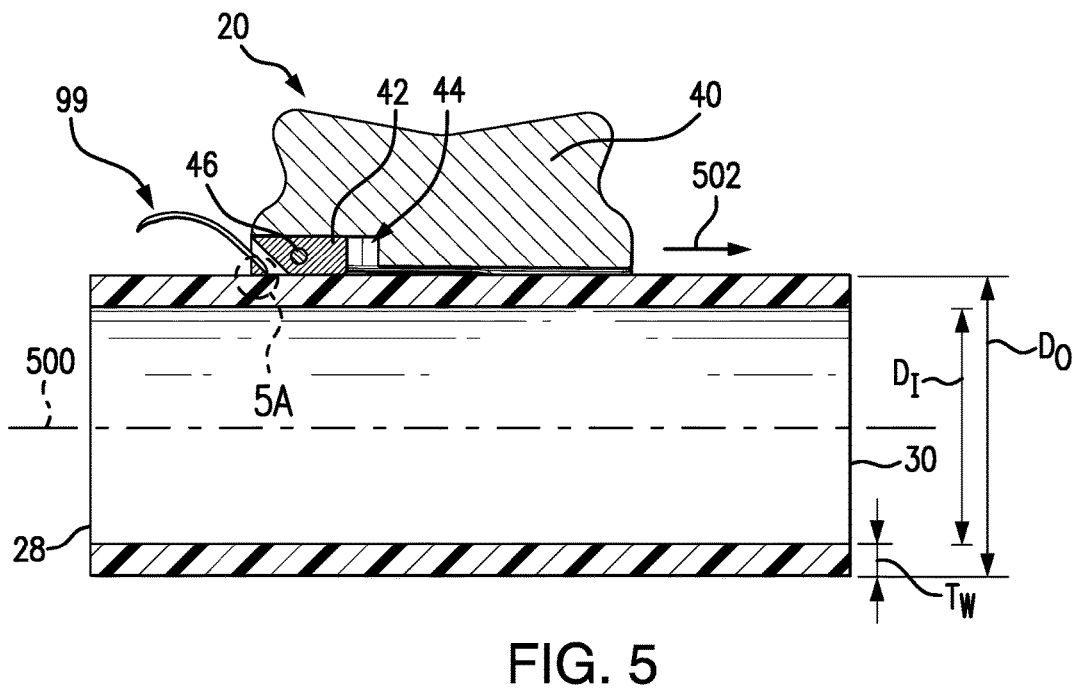

TUBE PEELING WITNESS GROOVE METHODS AND APPARATUS

BACKGROUND OF THE INVENTION

The invention relates to plastic piping. More particularly, the invention relates to preparation of plastic pipe/tube material for electro-fusion bonding.

In order to connect thermoplastic piping systems together via electro-fusion methods it is standard practice to remove the outer oxidized surface of the pipe to expose clean un-contaminated plastic. Typical previous methods rely on fixed or pivoting cutting tools and/or internal drive mandrels to remove the outer oxidized layers.

Examples of prior tools include those shown in U.S. Pat. Nos. 5,600,862, 6,434,776, and 6,698,321 and US patent application publications 2011232434A1 and 20150321260A1. A particular tool used with larger diameter pipe is the ROTARY PEELER RS by Georg Fischer Central Plastics of Shawnee, Okla., USA.

US patent application publication 20150321260A1 discusses problems of peeling out-of-round pipe. Smaller diameter pipe will acquire an oval shape due to coiling. Larger diameter pipe (e.g., shipped and stored in straight lengths) may acquire similar eccentricity due to stacking and handling To ensure sufficient depth of peeling, it is known to pre-cut a witness score or groove in the outer diameter of the pipe. If the subsequent peel is of a depth smaller than that of the groove, the removed curl from the peeling will be discontinuous, terminating and then restarting each time the peeler blade reaches the groove. Thus, observing a continuous peel confirms that the peel is at least the depth of the witness groove.

SUMMARY OF THE INVENTION

One aspect of the disclosure involves a tube scraping tool comprising: a handle; and a blade, carried by the handle. The tool has first and second laterally spaced apart portions for engaging the tube outer diameter (OD) surface during a drawing of the tool along the tube. The blade has a cutting edge positioned to trail the first and second portions during the drawing and laterally between the first and second portions.

A further embodiment may additionally and/or alternatively include the blade has a passageway for passing a curl of removed material.

A further embodiment may additionally and/or alternatively include the cutting edge protruding beyond a remaining portion of the blade at an inlet to the passageway by a height of at least 0.10 mm.

A further embodiment may additionally and/or alternatively include the height being 0.10 mm to 0.20 mm.

A further embodiment may additionally and/or alternatively include the blade being steel.

A further embodiment may additionally and/or alternatively include the blade being mounted to the handle via an axle.

A further embodiment may additionally and/or alternatively include the axle providing the blade with a restricted non-zero rotational range.

A further embodiment may additionally and/or alternatively include the restricted non-zero rotational range being at least 0.5°.

A further embodiment may additionally and/or alternatively include the handle having a compartment partially receiving the blade.

Another aspect of the disclosure involves a method for scraping a witness groove into the outer diameter (OD) surface of a tube. The method comprises: drawing a tool longitudinally along the OD surface. During the drawing, the tool is supported by laterally spaced apart portions engaging the OD surface and a blade trailing the laterally spaced apart portions.

A further embodiment may additionally and/or alternatively include, during the drawing, a curl of material passing through a passageway of the tool.

A further embodiment may additionally and/or alternatively include rotary peeling of the tube to a depth below a depth of the groove.

A further embodiment may additionally and/or alternatively include electro-fusing a fitting around the tube after the rotary peeling.

A further embodiment may additionally and/or alternatively include the drawing being a drawing by hand.

A further embodiment may additionally and/or alternatively include the method being performed on a plurality of tubes of a given nominal size. The trailing location of the blade and a pivoting of the blade accommodate tube-to-tube variations in curvature at a grooving location.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 3 is a first end view of the tool and pipe.

FIG. 4 is a second end view of the tool and pipe.

FIG. 4A is an enlarged view of a blade-to-pipe engagement taken at detail 4A of FIG. 4.

FIG. 5 is a central longitudinal sectional view of the tool and pipe taken along line 5-5 of FIG. 4.

FIG. 5A is an enlarged view of the blade-to-pipe engagement taken at detail 5A of FIG. 5.

Like reference numbers and designations in the various drawings indicate like elements.

DETAILED DESCRIPTION

Figure 1:
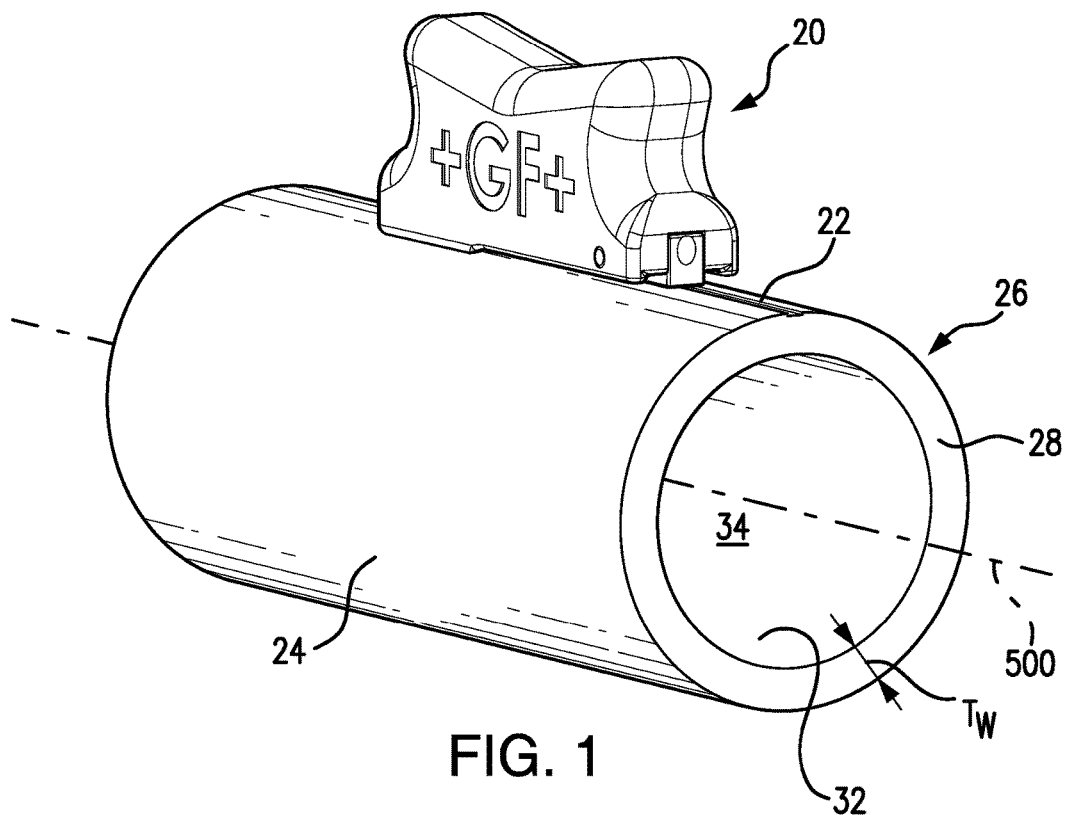
FIG. 1 is a view of a grooving tool cutting a groove in a pipe.
Figure 2:
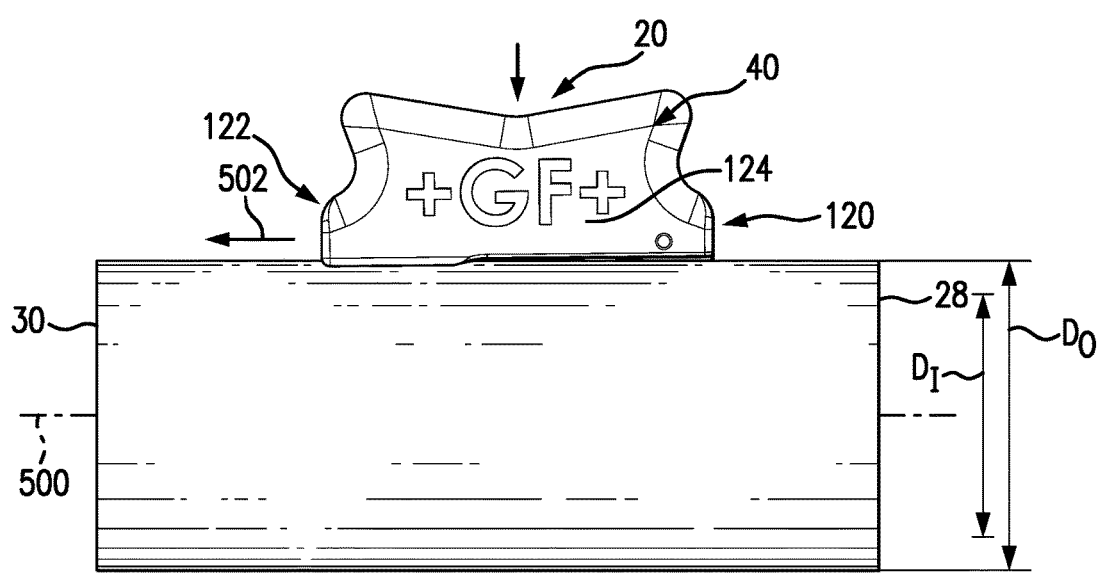
FIG. 2 is a side view of the tool and pipe.

FIG. 1 shows a tool 20 being used to apply a score (groove) 22 in the outer diameter (OD) surface 24 of a tube 26. The tube extends from a first end 28 to a second end 30 (FIG. 2) and has an inner diameter (ID) or inner/interior surface 32 surrounding a tube interior space 34. The tube has an inner diameter of $D_I$ and an outer diameter of $D_O$ leaving a wall thickness $T_W$ therebetween. The tube is shown having a central longitudinal axis 500. As a practical matter, manufacturing and in-use considerations (e.g., deforming of the tube during shipping) may leave the tube slightly out-of-round or otherwise imperfect. FIG. 4A shows the groove 22 being cut with a depth $D_G$. The groove is cut by drawing the tool 20 in a direction 502 (FIG. 5) parallel the axis 500. Exemplary $D_G$ is 0.005 inch to 0.006 inch (0.13 mm to 0.15 mm) for a 0.007 inch to 0.010 peel (0.18 mm to 0.25 mm). More broadly, an exemplary groove depth is 0.10 mm to 0.20 mm.

The tool 20 comprises a combination of a handle/body 40 and a blade 42. The blade 42 is held partially within a compartment 44 of the body such as via an axle 46, discussed below. Exemplary body materials are aluminum alloys or plastics. The body may be made of machining of alloy or molding of plastic or via additive manufacturing processes. The exemplary illustrated body is monolithic. However, alternative hollow assemblies are possible.

Figure 6:
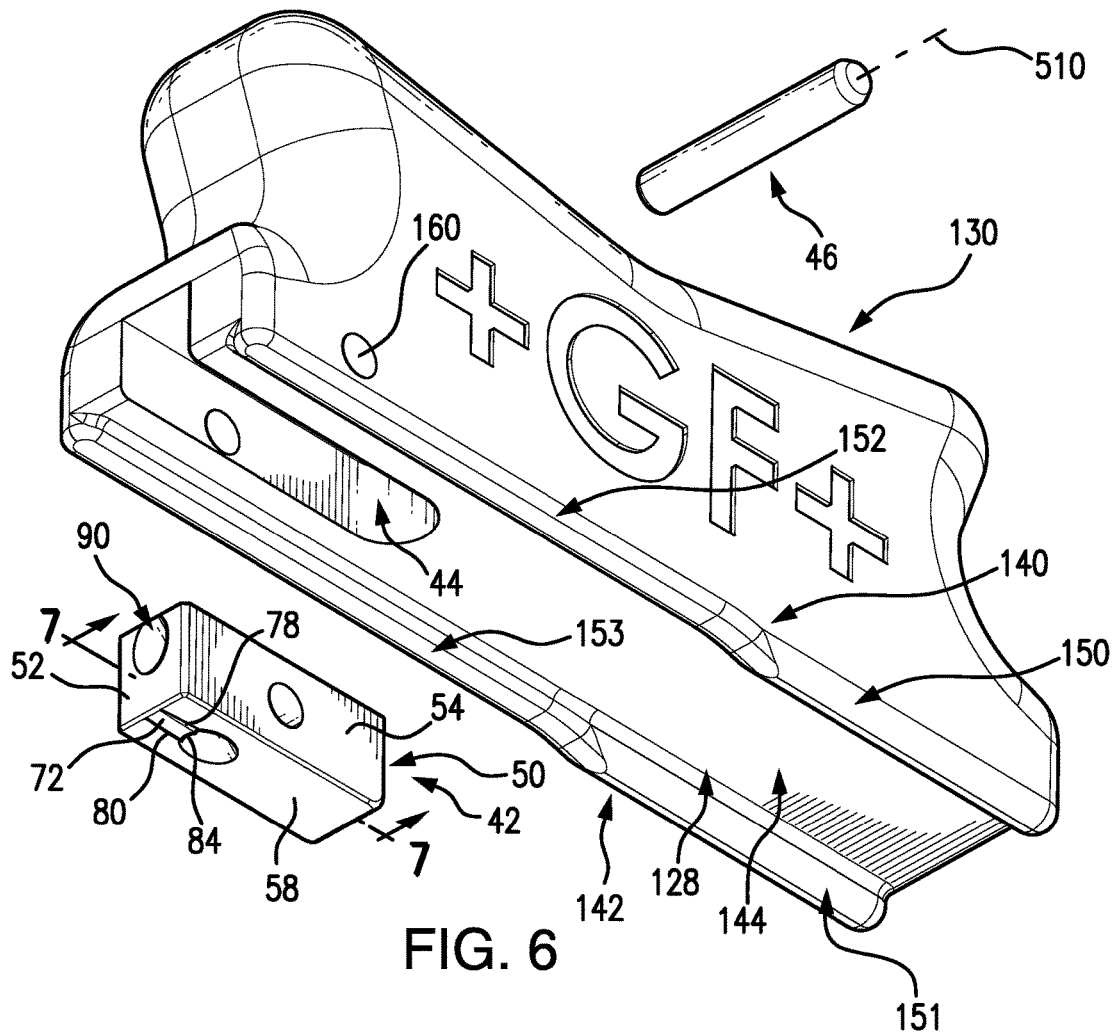
FIG. 6 is an exploded view of the tool.
Figure 7:
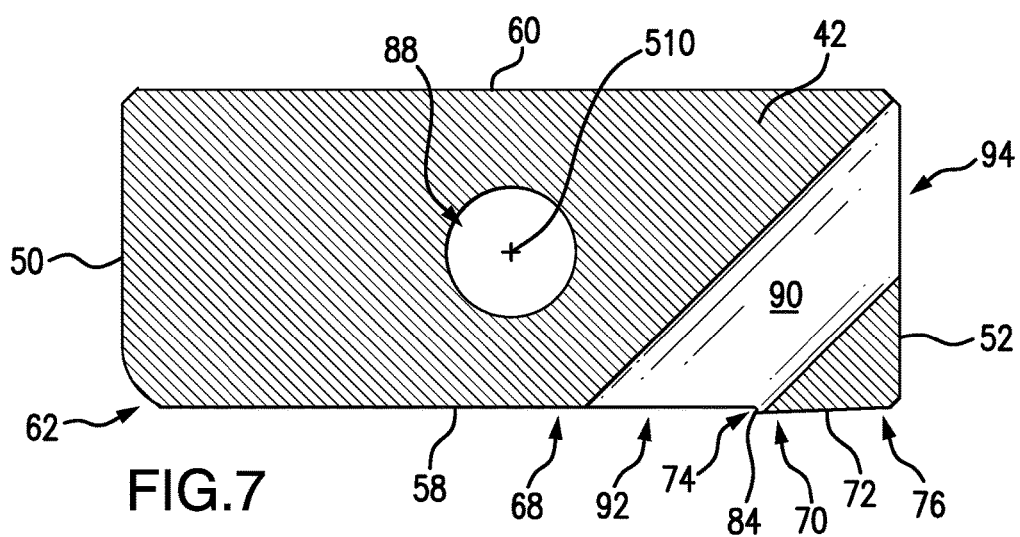
FIG. 7 is a central longitudinal sectional view of the blade taken along line 7-7 of FIG. 6.

The exemplary blade 42 (FIG. 6) is formed as a modified rectangular prism extending from a first end (face) 50 to a second end (face) 52 and having a first lateral side 54 (FIG. 4) and a second lateral side 56. The blade has an inboard (facing toward the axis 500 when in use) face 58 and an outboard face 60 (FIG. 7). In the exemplary blade, the lateral faces are the largest faces and the end faces are the smallest faces. A transition 62 between the first end face 50 and the inboard face 58 is rounded to avoid catching as the blade is drawn along the tube. The inboard face 58 comprises a generally flat main portion 68 and a cutting ramp 70. The ramp 70 has an inboard face 72 that extends from a leading end 74 to a trailing end 76. The ramp has lateral surfaces 78 and 80 (FIG. 6). At the leading end 74, a leading edge of the surface 72 falls along a cutting edge 84. A protrusion of the edge 84 beyond the surface 68 generally corresponds to the groove depth $D_G$. The blade is held in place by the axle 46 passing through a transverse hole 88 in the blade having an axis 510. In at least some embodiments, the compartment 44 is sized to allow the blade a small range of rotation (e.g., at least 0.5° or at least 1.0° or an exemplary 1.0° to 2.0° (e.g., nominal 1.5°)) about the axis 510 via the axle 46. This small degree of freedom may allow the blade to maintain an ideal orientation despite variations in tube OD. The upper ends on the range are merely a matter of convenience to keep the blade in an orientation close enough so that the applying to the pipe can bring the blade into a more exact alignment. Thus, although only 1° or so may be desired/needed, even 10° or more may not be detrimental. These variations may not merely be tolerances but rather variations associated with use on different nominal sizes of tube. Exemplary tube outer diameter is 1.5 inch or greater (38 mm or greater). Exemplary tube (and electrofusion fitting) materials are polyethylene (PE, e.g., HDPE or LDPE), polypropylene (PP), polyvinyl chloride (PVC), and the like.

To evacuate material cut from the groove, the exemplary blade comprises a channel or passageway 90 extending from an opening 92 in the inboard face 58 to an opening 94 in the second end face 52. As the blade is drawn along the pipe, the edge 84 cuts a curl 99 (FIG. 5) of material which then can pass through the opening 92 and out the opening 94.

The exemplary blade material is steel. The blade may be machined from strip or bar stock. For example, the stock may have a thickness corresponding to the dimension between the faces 54 and 56 and another dimension corresponding to an overall height between the face 60 and at least the edge 84. The remaining surface 58 may be machined to create the portion 64 leaving the ramp 70 proud. The holes 88 and 90 may then be drilled such as to form circular sectioned holes. The edge 84 may be left proud by a height equal to the desired groove depth. The corners of the cross-section viewed in FIG. 7 may then be machined such as by grinding so as to form the rounded transition 62 and bevels on the other corners.

The body 40 (FIG. 2) extends from a first longitudinal end 120 to a second longitudinal end 122 and has respective first and second lateral sides 124 and 126. The body has an underside 128 (FIG. 6) and an opposite top or outboard extremity 130. The underside 128 is formed of a generally channel-like section having a pair of side rails 140, 142 and having a base surface 144. Each of the rails 140, 142 has a leading portion 150, 151 and a trailing portion 152, 153. The leading portion is higher than the trailing portion. In operation, the leading portions 150 of the two rails would contact circumferentially spaced locations along the tube surface 24 while the blade contacts a third location. This provides a precise cutting depth regardless of roundness of the tube. For example, if the two rails at full height were adjacent the blade, then the groove would have greater depth in a smaller diameter pipe than in a larger diameter pipe. Similarly, in an eccentric (e.g., slightly flattened) pipe, the groove would be deeper at a circumferential location having a smaller radius of curvature than another location. Thus, the recessing of the trailing portions 150 and the associated three-point contact renders groove depth less sensitive to eccentricity.

FIG. 6 also shows axle holes 160 on either side of the compartment 44 for receiving end portions of the axle 46 (e.g., in a press fit situation). Exemplary press fits may involve the axle being press fit into one or both of the portions of the body beside the compartment and/or into the hole 88. Alternative mounting of the blade may include screwing or other fasteners. As is noted above, the witness groove is formed by manually longitudinally drawing the tool from the end of the tube by the distance intended for subsequent peeling and electro-fusion (e.g., the longitudinal span of the electro-fusion socket into which the tube is to be inserted). The rotary peeling may be performed in one or more stages with a continuous curl spanning the groove evidencing sufficient depth of peeling. Thereafter, the tube end (now ungrooved at least over the relevant electro-fusion portion) may be inserted into the electro-fusion fitting and electro-fused.

One or more embodiments of the present invention have been described. Nevertheless, it will be understood that various modifications may be made without departing from the spirit and scope of the invention. Accordingly, other embodiments are within the scope of the following claims.

What is claimed is:

1. A tube scraping tool comprising:
    a handle; and
    a blade, carried by the handle,
   wherein:
    the tool has first and second laterally spaced apart portions for engaging the tube outer diameter (OD) surface during a drawing of the tool along the tube, wherein the underside of the handle is formed of a generally channel-like section having first and second side rails and having a base surface;
    the first and second portions are respective first and second leading portions of the respective first and second side rails;
    the first and second side rails have respective first and second trailing portions;
    the blade has a cutting edge positioned to trail the first and second leading portions during the drawing and laterally between the first and second side rails; and
    the first and second leading portions are higher than the first and second trailing portions.
2. The tube scraping tool of claim 1 wherein:
    the blade has a passageway for passing a curl of removed material.

3. The tube scraping tool of claim 2 wherein:
the cutting edge protrudes beyond a remaining portion of the blade at an inlet to the passageway by a height of at least 0.10 mm.

4. The tube scraping tool of claim 3 wherein:
the height is 0.10 mm to 0.20 mm.

5. The tube scraping tool of claim 1 wherein:
the blade is steel.

6. The tool of claim 1 wherein:
the blade is mounted to the handle via an axle.

7. The tool of claim 6 wherein:
the axle provides the blade with a restricted non-zero rotational range.

8. The tool of claim 7 wherein:
the restricted non-zero rotational range is at least 0.5°.

9. The tool of claim 1 wherein:
the handle has a compartment partially receiving the blade.

\* \* \* \* \*